Nov. 28, 1961     K. RENNSPIES     3,010,331
DRIVING MECHANISM FOR SOUND RECORDING AND REPRODUCING DEVICES
Filed June 15, 1960

Inventor:

3,010,331
DRIVING MECHANISM FOR SOUND RECORDING AND REPRODUCING DEVICES
Klaus Rennspies, 50 Neue Heimat, U.S. Sector,
Berlin-Lichtenrade, Germany
Filed June 15, 1960, Ser. No. 36,451
Claims priority, application Germany June 20, 1959
4 Claims. (Cl. 74—207)

Driving mechanisms for magnetic tape recorders are known which use the following procedure for driving the spool discs: a friction disc driven by the motor is fitted on an axle on which the spool disc rests loosely and the rotary movement is transmitted by friction to the spool disc. In order to obtain a favourable power transmission especially at high speed between the spool disc and the friction disc, mechanisms of this kind frequently have an arrangement by means of which a coupling roller—itself not driven—presses radially at the side against the edges of the spool disc and friction disc so that these are firmly coupled together. The disadvantage of this method lies in the fact that, in order to obtain a sufficiently tight coupling, a relatively powerful pressure of the coupling roller on the spool disc and friction disc is necessary.

According to the invention, this difficulty is overcome by providing a drive mechanism with the coupling roller and the parts of the spool disc meshing with it shaped in such a way that, on radial pressure of the coupling roller on the spool disc and the friction disc, a pressure component takes effect at the same time in the direction parallel to the axle. This is brought about by arranging the friction surfaces of the spool disc, friction disc and coupling surface diagonal to the axle in profile. The mechanism can then be arranged so that, on lateral pressure of the coupling disc in a radial direction, the spool disc and friction disc are either pressed against each other so that the direct friction between them is increased or pressed away from each other so that the direct friction between spool disc and friction disc is reduced or abolished.

Figure 1A:
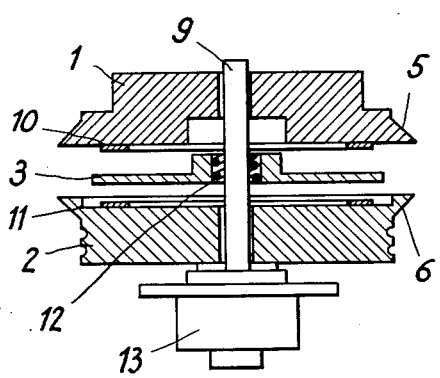
Figure 1B:
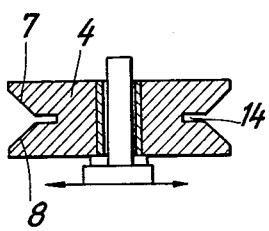
Figure 2:
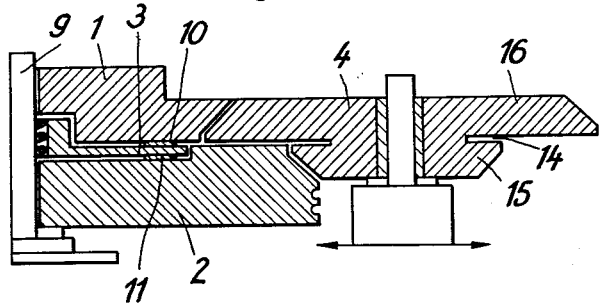

FIGURE 1a and 1b, and FIGURE 2 show two examples showing the practical execution of the invention:

FIGURES 1a and 1b shows an example of the invention as a sectional diagram at about natural size and extended in the axial direction for the sake of clarity: 1 is a spool disc freely moving on the fixed shaft 9 and having on its rear side a preferably ring-shaped friction lining 10 made, for example, of felt. 2 designates a friction disc driven by the motor, e.g. by drive rope, also with a friction lining 11, preferably in the shape of a felt ring. Between the spool disc and the friction disc is a distance piece preferably of plastic material. Between the distance piece and the shaft 9 is a loop spring 12 which blocks the distance piece in a direction of rotation of the friction disc on the shaft 9. The coupling roller which is displaceable in the direction of the arrow and which couples the spool disc and the friction disc together at high speed is marked 4. It is made of rubber or a suitable plastic material. According to the invention, the spool disc, friction disc and coupling roller have bevelled surfaces 5, 6, 7, and 8 which mesh together on lateral displacement of the coupling roller. The angle formed by these bevelled surfaces to the shaft 9 is best fixed at 45 degrees. The shaft 9 is fastened on a structural part 13 suitable for insertion in the upper casing (sheet bar) of a magnetic tape recorder.

The operational method of this mechanism will now be described in detail: At normal speed, the tape is wound on a spool rigidly mounted on the spool disc 1 and not shown in the diagram and is preferably wound off from a second structural part formed identical with the parts 1 to 13 and carrying the supply spool. In this arrangement, the drive of the spool disc 1 is carried out by friction coupling between the friction disc 2 driven by the motor by means of the relevant friction linings 10 and 11 via the distance piece 3. At high speed, the coupling roller 4 is pushed in such a way that the bevelled friction surfaces 5, 7 and 6, 8, respectively mesh together. Owing to the bevelled shape of the friction surfaces which together form an angle opened towards the axle of the spool disc and friction disc, a vertical force component arises which takes effect on the spool disc from above and on the friction disc from below and this presses the spool disc 1, the distance piece 3 and the friction disc 2 against each other. In this manner, a tight coupling between the spool disc, the distance piece and the friction disc is obtained with limited means. The loop spring 12 in the distance piece 3 moves freely on the fixed axle when the tape is wound up, no matter whether the device runs at normal or high speed.

In the operating state with the spool mounted on the disc 1 being wound off, the disc 1 is accordingly turned in the opposite direction to that when the spool is wound on and the loop spring 12 tightens on the shaft 9 and blocks the distance piece 3. As a result, a certain constant braking of the spool disc 1 is obtained and tightening of the tape effected.

The advantageous effect of the vertical coupling component occurring on pressure of the coupling roller 4 and pressing the spool disc 1 and the friction disc 2 against each other can be further intensified by an additional elastic form of the coupling roller 4 taking effect in this direction. For this purpose, the inner edge of the groove made in the coupling roller 4 is fitted with a circular shaped incision 14 pointing towards the axle and lying vertical to it.

A further advantageous example of the present invention is as follows: the parts meshing together, that is, spool disc and friction disc on the one hand and coupling roller on the other hand are arranged so that, on radial pressure of the coupling roller on the two other parts, a transmission is effected. Such a transmission is above all of advantage when it comes to obtaining the quickest possible high speed. The means for realizing such a transmission are shown in FIGURE 2 of the drawing: According to this, the diameter of the spool disc 1—the right part of which is shown in the diagram—is made smaller than the diameter of the friction disc 2. In the same manner, in connection with this, the lower part 15 of the coupling roller 4 meshing with the friction disc 2 is smaller in diameter than the upper part 16 of this coupling roller. With this construction, an increase in the speed of rotation occurs on power transmission both between the friction disc 2 and the lower part 15 of the coupling roller 4 and between the upper part 16 of the latter and the spool disc 1 when the diameter of 2 is greater than that of 15 respectively and the diameter of 16 is larger than that of 1. However, in any case, an increase in speed is obtained in comparison to the effective transmission at the ratio of 1:1 according to the example in FIGURE 1 even when the ratio of the various diameters to each other deviates from this. The condition is merely that the lower part 15 of the coupling roller 4 has a smaller diameter than the upper part 16 and the difference in the diameters of parts 1 and 2 is correspondingly of the same size. A further condition for the example shown in FIGURE 2 is that a direct surface friction of the discs 1 and 2 on each other via the distance piece 3 should be avoided owing to the varying speeds which would then occur. Accordingly in FIGURE 2, the bevelled surfaces of the discs 1 and 2 respectively the parts 15 and 16 of the coupling roller are arranged so that the pressure components directed parallel to the axle and arising on coupling take effect in a direction which attempts to press the discs 1 and 2 away from each other. Therefore, a collar piece on the upper end of the shaft 9 preventing the spool disc 1 from being pressed too far upwards is advisable.

What I claim is:

1. A driving mechanism for sound tape recording and reproducing devices comprising in combination: a motor-driven friction disc, a tape reel carrying disc coaxially mounted and frictionally couplable with said friction disc, and a coupling roller radially engageable with said discs, the axis of said coupling roller lying parallel to the common axis of said friction disc and said reel carrier disc and the coupling roller being adapted to be shifted parallel to its plane for meshing with said discs, thereby radially transmitting a rotation directly from said friction disc to said reel carrier disc for providing a rapid speed, the diameter of said friction disc being larger than that of said reel carrying disc and the part of said roller meshing with said friction disc being by the same amount smaller in diameter than the part meshing with said reel carrier disc.

2. A driving mechanism according to claim 1, in which a groove is arranged between the roller part meshing with said friction disc and the roller part meshing with said reel carrier disc.

3. A driving mechanism according to claim 1, in which the parts of said roller meshing with said friction disc and said reel carrier disc are bevelled in such a manner that, on radial pressure of said roller, axes parallel pressure components are partly effective.

4. A driving mechanism according to claim 3, in which the bevelling is shaped in such a manner that the pressure components running parallel to the axes press said friction disc and said reel carrier disc away from each other.

References Cited in the file of this patent

UNITED STATES PATENTS

| 125,252 | Baldwin | Apr. 2, 1872 |
| 451,987 | Underwood | May 12, 1891 |
| 957,277 | Underwood | May 10, 1910 |
| 1,406,792 | White | Feb. 14, 1922 |